Figure 2:
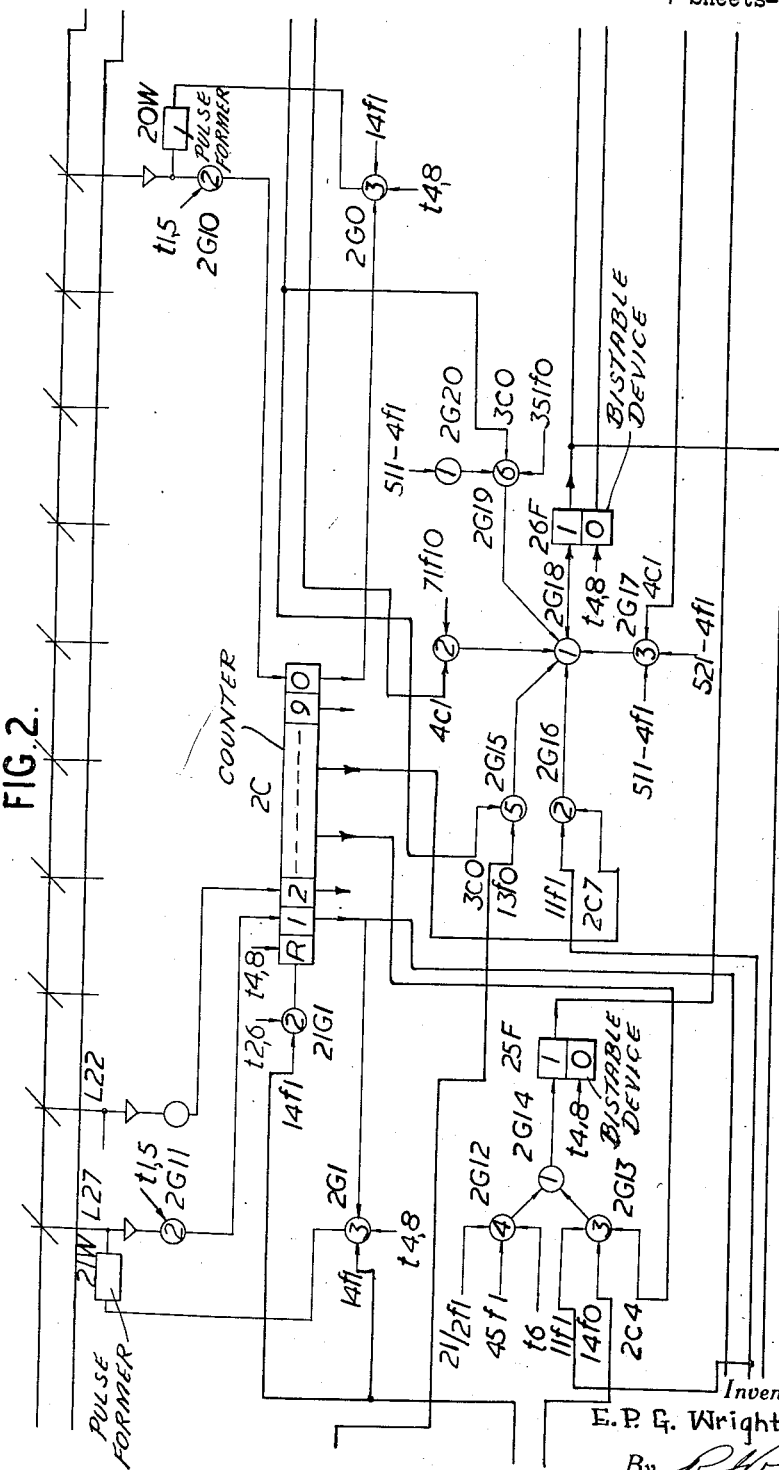

Dec. 12, 1961     E. P. G. WRIGHT     3,013,120
DATA PROCESSING SYSTEMS
Filed Oct. 8, 1957     7 Sheets-Sheet 1
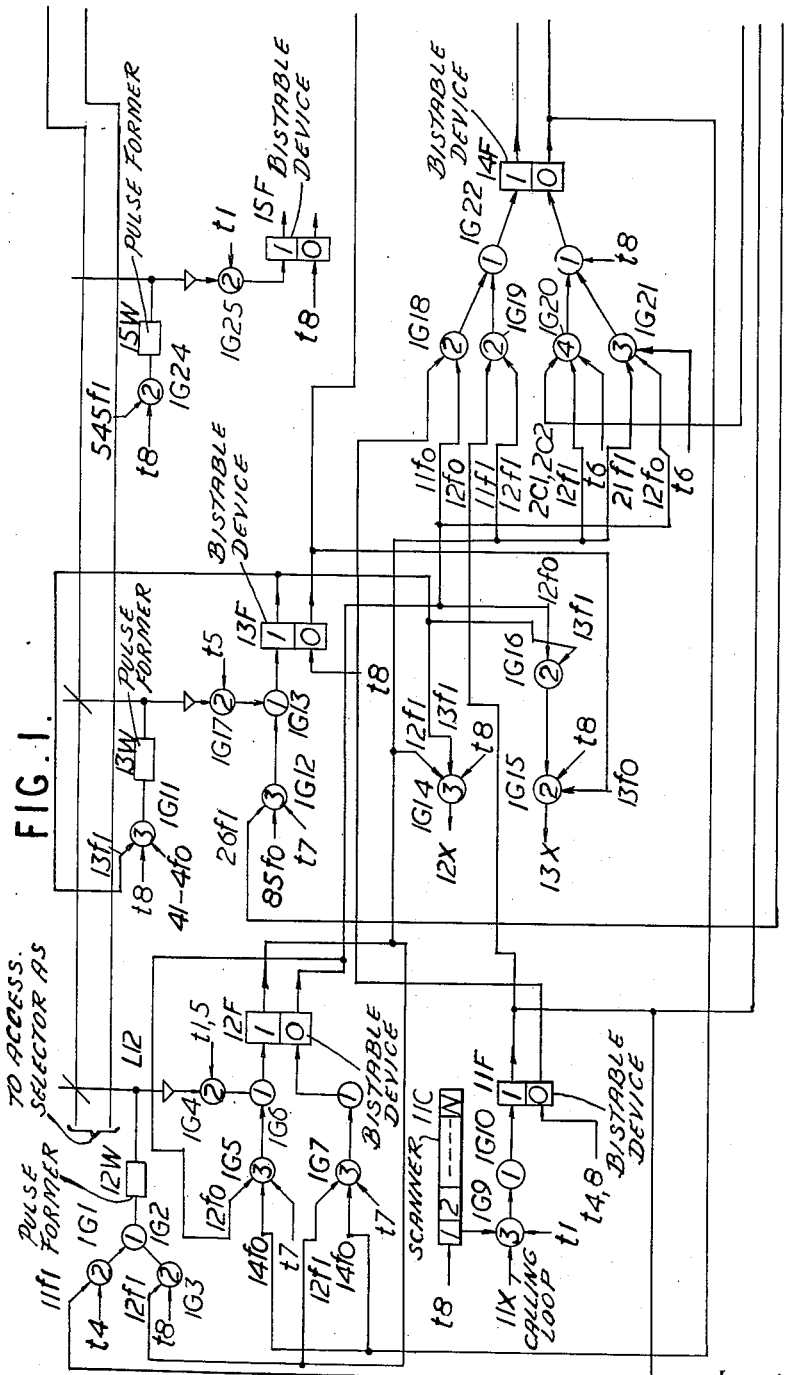
Inventor
E. P. G. Wright
By 
AGENT

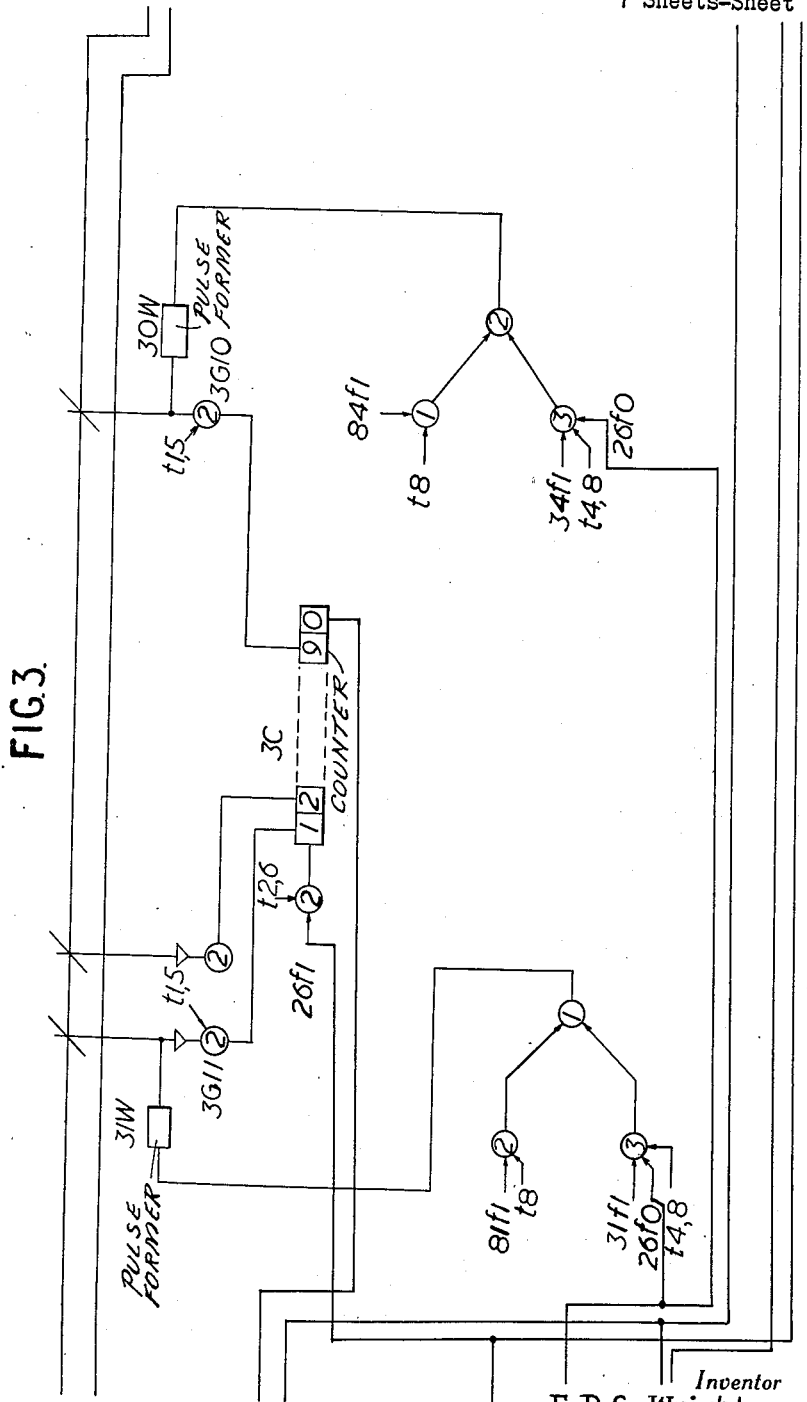

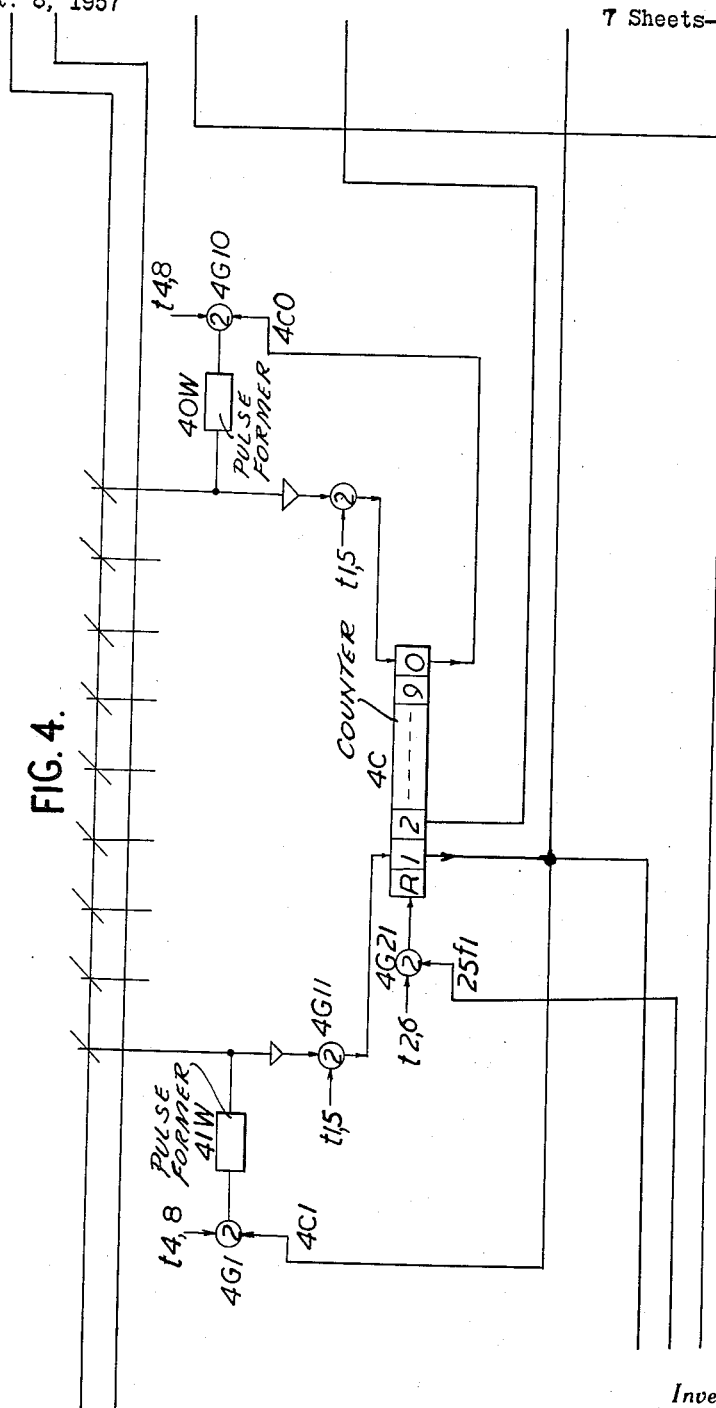

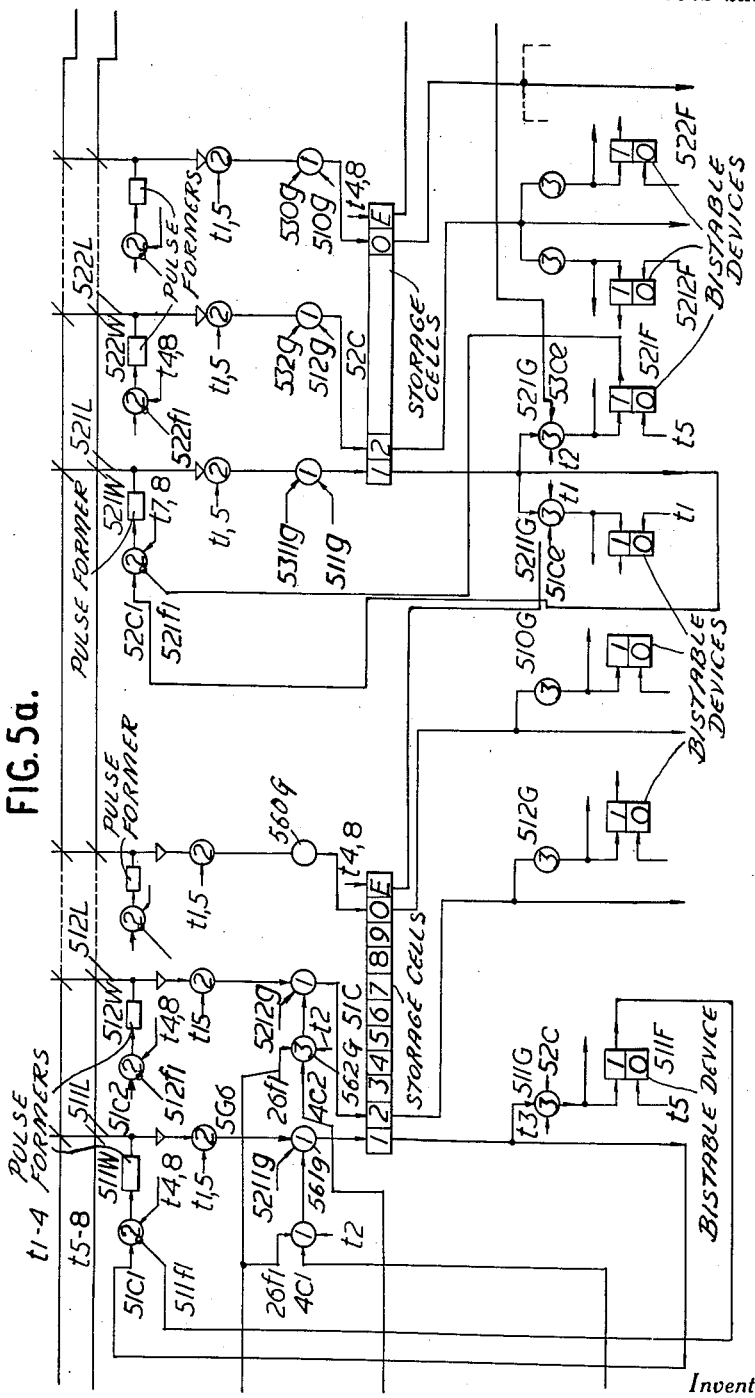

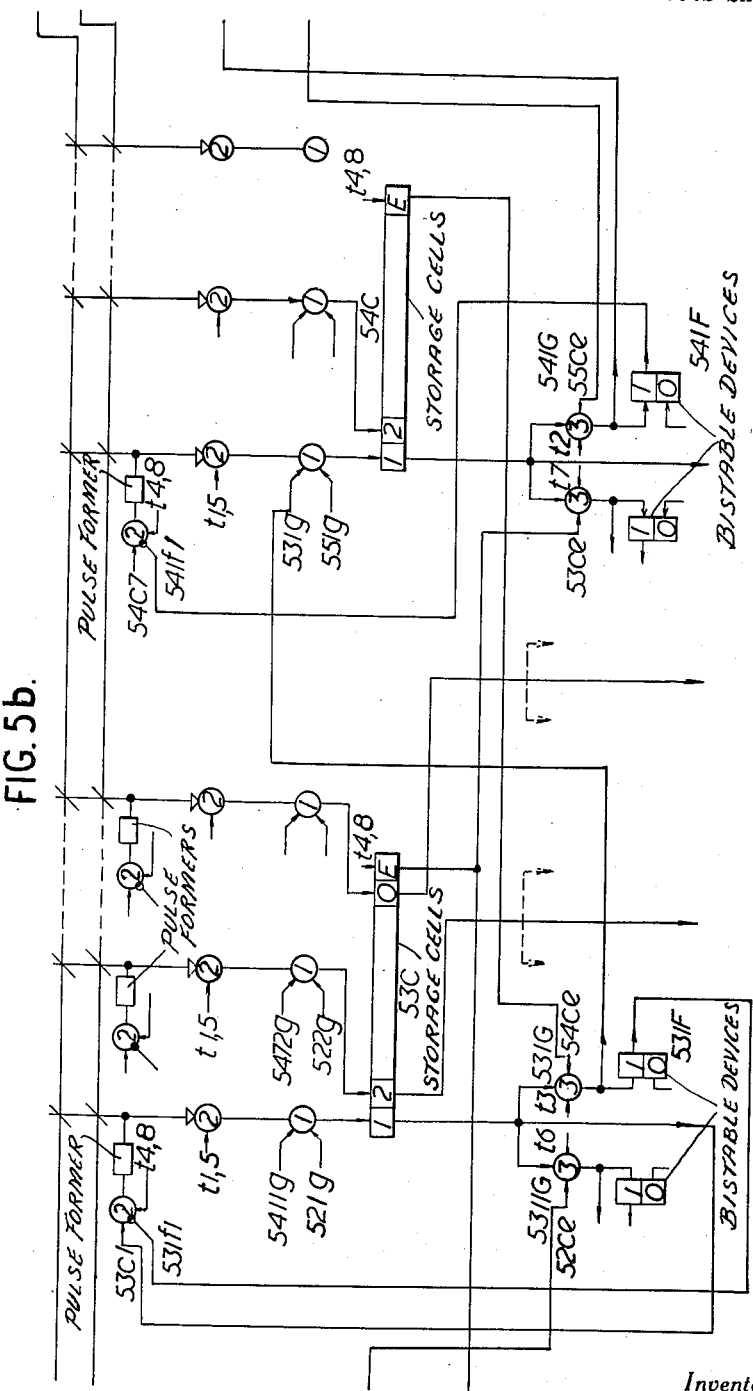

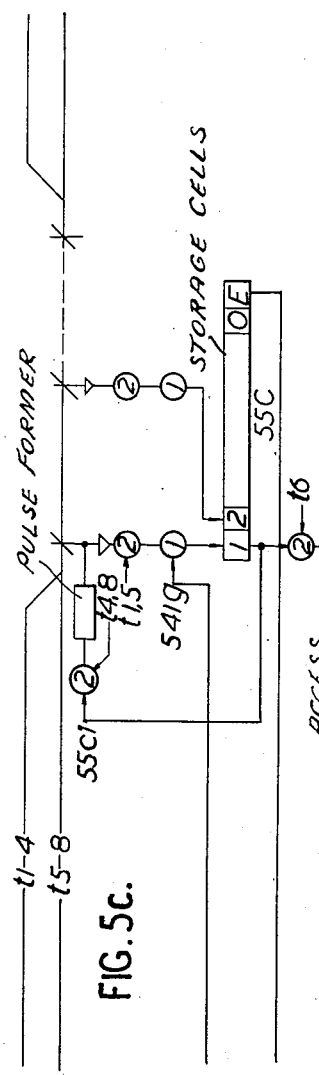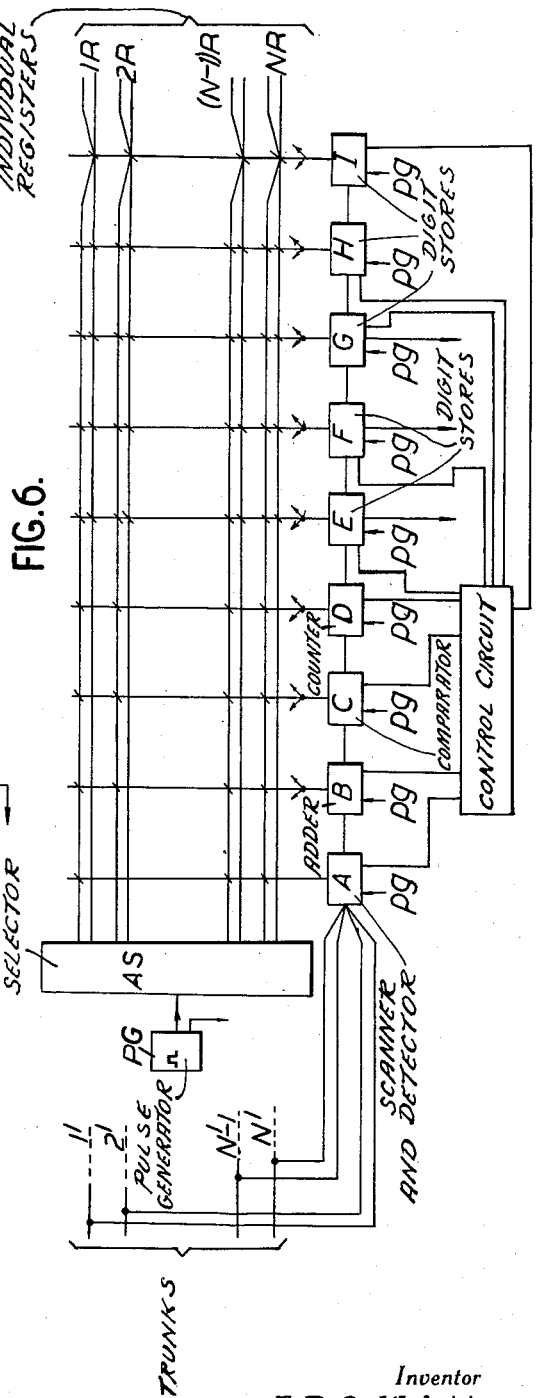

3,013,120
DATA PROCESSING SYSTEMS

Esmond Philip Goodwin Wright, London, England, assignor to International Standard Electric Corporation, New York, N.Y., a corporation of Delaware
Filed Oct. 8, 1957, Ser. No. 688,949
Claims priority, application Great Britain Oct. 12, 1956
5 Claims. (Cl. 178—50)

This invention relates to data processing equipment and has for its object the handling of a number of similar complex data processing operations simultaneously by common equipment.

The main feature of the invention comprises equipment for concurrently processing a number of information items on a multiplex basis which has several cooperating circuits. There are user circuits from each of which a respective information item can be available. There is a common data processing circuit for handling a sequence of data processing operations. There is a matrix of storage cells arranged in rows and columns which has a respective pair of rows individual to each of said user circuits and which is divided up into sets of columns each allocated to a particular operation in said sequence of data processing operations and each associated with a respective common set of storage cells in said common data processing circuit. There is also equipment for applying half-write pulses to all the column circuits of said matrix under control of said common sets of storage cells in synchronism with half-write pulses on said rows. There is access equipment for giving access in a first repetition time cycle to the rows of cells in said matrix and for applying read and half-write pulses in turn to each row of cells during each association therewith. There is scanning equipment between said common data processing circuit and said user circuits for scanning said user circuits in a second repetitive time cycle having half the speed of the first cycle, and for permitting, in seriatim, the entry of data into said common data processing circuit from said user circuits. Horizontal transfer equipment is included in said common data processing equipment for transferring data between different common sets of storage cells in said common data processing circuit, so that such data can travel in both directions in turn along the common equipment and therefore along said matrix. A pulse generator is also provided for producing an electrical pulse sub-cycle covering two time positions of said first repetitive time cycle and having $2x$ pulses per cycle (so that $x$ pulses of said cycle occur in each time position of said first cycle). Vertical transfer means is provided at one end of said common data processing equipment for transferring data from one row to another in said matrix. All the circuits are so arranged that data in each pair of rows is entered in the common set of storage cells whilst the respective user circuit is associated with said common data processing circuit, that a sequence of data processing operations take place in turn in successive positions in said common circuit in both directions in turn, that the operations included in the "East-West" travel of data all take place in the first $x$ pulses of each sub-cycle and the operations included in the "West-East" travel of data all take place in the second $x$ pulses of each sub-cycle, that the contents of the common sets of storage cells are stored in one row of matrix cells of a pair of rows individual to a user circuit by means of said half-write pulses on the one row and on all columns after an "East-West" operation has been handled and are stored in the other row of matrix cells individual to the user circuit after a "West-East" operation has been handled, and that transfer of data from one matrix row of a pair of rows to the other takes place by said vertical transfer means at the "West" end of said common data processing circuit.

Matrix storage cells can be provided with different types of access in one of which the stores are set one at a time in serial fashion, whereas in another type of access a complete row of stores are set simultaneously. It is this latter type of access which is concerned here, such parallel access stores being used in conjunction with common data processing equipment to act as a register controller or register translator for an automatic telecommunication exchange.

Parallel access does not lend itself to the utilisation of a row for operational purposes and in the system to be described the rows of stores are individually used to memorise a state of affairs in connection with the setting up of a like number of connections while the control circuit controls the setting up of the number of connections up to a maximum equal to the number of rows of stores, on a multiplex basis.

In other words a control circuit samples the condition of each of a number of incoming calls in a time cycle the duration of which is very small compared with any one of the events to be identified and recorded in the setting up of a connection. The momentary connection of the control circuit to a calling circuit is simultaneous with the association of the control circuit to the corresponding storage rows. The control circuit receives from the stores the state of affairs at the last association, tests the condition of the calling circuit, makes the appropriate change in the record of the state of affairs to the storage row before terminating the association and passing on to the next calling circuit.

It will be seen that the control circuit can pick up a call at any time and that it can deal with calls in different stages of setting up during the same period of time, because at each association it is informed by the register or storage row what state of affairs has to be dealt with. The time cycle of association between the control circuit and all the storage rows is used as the basic time unit for determining the length of any time period such as the length of an impulse break or impulse make, an inter-digital pause, etc.

The control circuit is provided with a number of decimal counting trains for counting various events in connection with the setting up of a connection.

The decimal counting trains can be of any well-known construction and therefore are shown in block schematic form only in order to keep the description as simple as possible.

In the setting up a connection by means of a register and translator there are three main operations, namely, the receipt of the wanted party's number from the calling party, the translation of the exchange portion of the wanted party's number into routing digits, and the control of the setting up of the connection by means of the routing digits.

Because the exchange portion of a wanted number is usually less than half of the complete number and because translation can be extremely quick, the setting up of the connection by means of the routing digits can start while the remaining part of the wanted party's number is being received. Of course there is nothing new in this and it is done in conventional systems. However it presents a new problem when a number of connections are being handled on a multiplex basis. In the present case a sub-cycle of electrical pulses is used the duration of which is equal to one association time of the control circuit with a register. The number of pulses in a sub-cycle has been chosen in the example given as eight. The first half of the sub-cycle (pulses 1—4) is used to control the receipt of the wanted number, while the second half of the sub-cycle (pulses 5—8)

can be used inter alia for controlling the setting up of the connection in accordance with the routing digits together with the local digits. Thus in the early part of the handling of a particular connection, while the exchange designation is being received, only the first half of each association time will be effectively used. After translation of the exchange digits, and while the remaining digits are being received from the calling party, both halves of the sub-cycle will be in use for reception and out-going control during each association, while after the wanted party's number has been completely received, the second half only of each sub-cycle will be in use for completing control of the setting up of the connection.

For a better understanding of the invention and to show how the same may be carried into effect, reference will now be made to the accompanying drawings, in which:

FIGS. 1 to 5 show functionally circuitry of data processing for use as a telephone register, and FIG. 6 is a block circuit diagram of FIGS. 1 to 5.

Referring first to FIG. 6, a number N of user circuits are shown which, in the present example, are taken to be trunks in a telephone exchange, such user circuits being indicated at $1'$, $2'$, $N'-1$, and $N'$. A matrix of storage cells is indicated by crossing vertical and horizontal lines. The existence of a storage cell is shown by a transverse line at a cross point formed by a horizontal and a vertical line. In effect the matrix is formed by storage cells arranged in rows and columns. For reasons which will be apparent, there are twice as many rows as user circuits, and each pair of rows 1R to NR is for use with one user circuit and constitutes an individual register. The columns of storage cells are divided up into sets. There is, however, in one case, only one column in a set. Each set of columns is associated with a respective common set of storage cells, indicated by the blocks A to I, and the blocks constitute common data processing equipment. It will be noted that one set of columns, associated with block I, has cells each of which is threaded by both row wires of the register in which the cell is comprised. The block A is the one associated with only one column.

The block PG indicates a pulse generator which generates pulses during periods of time $t1$ to $t8$. The pulses during periods $t1$, and $t5$ are "read" pulses and those during periods $t4$ and $t8$ are half-write pulses. The pulses in $t2$, $t3$ and $t6$, $t7$ are used for controlling the operation of various gates.

The block AS indicates an access selector which passes in turn the read/write pulses (in $t1$, $t4$) to one row of a register and then the read/write pulses (in $t5$, $t8$) to the other row of the register, this then being repeated for the next register.

In operation the trunks $1'$ to $N'$ are scanned in turn by means in block A to test the state of the trunks, i.e. for the "open" or "closed" loop condition. A trunk is effectively associated with the block A during $t1$ to $t8$, and during this period the state of the trunk is recorded in the respective individual register. For example the state of trunk $1'$ is recorded in register 1R in one cell of one row thereof. The state of the trunk remains recorded in the cell until the next association. The stored state is then compared with the latest state. If the states are the same this fact is noted and stored by the cells of the column set associated with the block B which notes, by means of an adder, the number of consecutive times that the states are the same, i.e. "open" or "closed" loop. The time between scans can be set at a period such as 16 ms., and the adder can be arranged to count up to 15 periods of 16 ms. or 240 ms. The record of "open" or "closed" is retained in an individual register and added to only if the condition in the respective trunk is found to remain the same, but if there is a change of condition the adder is returned to zero. In this way the duration of "open" or "closed" conditions is measured by a single adder in co-operation with the cells of the individual register. If the "open" condition persists for more than 32 ms., it is accepted as an impulse, which fact is noted in the block C and stored by the set of cells in the appropriate individual register associated with C. But if it persists for say 192 ms., it is recognised as a disconnect signal. Similarly, if the "open" condition persists for a period of less than 48 ms., it is accepted as an inter-impulse period, whereas if it persists for a longer period it is recognised as an interdigital pause. The pulses are counted by C and the result is stored between every two associations in the cells associated with C. When an interdigital pause is noted by B, the number of pulses counted and held in C is the digit and this is transferred to E. During each association thereafter the digit is transferred from block to block in co-operation with the cells in the row which has read/write pulses applied to it during $t1$ to $t4$, which row for shortness is called the $t1$ to $t4$ row. When the digit reaches the end of the individual register i.e. the end of the $t1$ to $t4$ row thereof, the digit is transferred by block I to the other row, i.e. the $t5$ to $t8$ row of the register. The digit is then again transferred from block to block till it reaches E. In the same way, the next digit traverses the blocks E to I and back. But in this case, it remains in block F as block E is occupied. The third digit reaches block G by the same route.

The block D is used for counting the digits and when, for example, the first three digits (code digits) have been entered, a signal can be given by D to call a translator. These first three digits are held in E to G during $t5$ to $t8$ and can be transferred simultaneously during $t5$ to $t8$ to the translator. Eight digits can be stored and four digits can be extracted simultaneously from an individual register during $t5$ to $t8$.

FIGS. 1 to 5 show one of the individual registers for entering information from one of the trunks. The circuitry of the blocks E to I shown in FIG. 6 are drawn in detail in FIG. 5, but the pulse generator PG and the access selector are not drawn in detail as such equipment is known. It will be recalled that the pulse generator repeatedly generates a series of pulses during time periods $t1$ to $t8$, the pulses during $t1$ and $t5$ being read pulses, those in $t4$ and $t8$ being half-write pulses, whilst the remainder serve to actuate various gates as will be described.

A scanning device 11C (FIG. 1) has N stages and is arranged to step during $t8$. The output of each stage causes one trunk and the respective individual register to be associated. Whilst e.g. stage 1 gives an output, read and half-write pulses are applied to the pair of row wires of the matrix of storage cells which comprises individual register No. 1. The read and half-write pulses of $t1$ to $t4$ are, however, applied only to a first row, and those of $t5$ to $t8$ to the second row.

Each individual register is associated with the common data processing equipment in the same manner, and therefore only the various associations of one individual register (No. 1) with the common equipment and the respective trunk will be described.

*First association*

In time $t1$, provision is made for transferring from the individual register to the common equipment the whole set of data stored in the individual register. All the test gates for the 'incoming' condition, e.g. 1G4, 1G17, 1G25, 2G11—10, 3G11—10 etc. test the condition of the respective register cores of the first row in time $t1$, and if any such core is in the '1' condition, open to energise the '1' side of a corresponding bistable device or counter. For instance, gate 1G4 tests the condition of the register core threaded by the column wire L12. Assuming that the register has only just been seized, the gates will remain closed, since no data is stored in the register cells to be read out and cause the gates to open. In time $t1$ also the condition of the incoming calling circuit loop 11X is tested by gate 1G9 and since the loop is closed and scanner 11C is at stage 1 corresponding to register No. 7, gate 1G9 opens followed by 1G10 and 11F changes to condition 1.

Since 11F is in position '1' and 12F is in position '0,' neither gate 1G18 or 1G19 will open and 14F will remain in condition '0.' In time t4, gate 1G1 will open followed by 1G2 and a half-write pulse will be applied by 12W to L12 to change the corresponding register core to condition '1' in co-operation with the half-write pulse applied to the row wire and so store the information that the condition of the calling loop is closed. In t5, 12F is operated to '1' from the register and in t8, gates 1G3, 1G2 are opened too. Thus '1' is stored again in the mentioned register core.

Second association

In time t1, assuming that dialling has not commenced, 11F is again operated to condition '1,' and as the L12 core is in condition '1,' gate 1G4, 1G6 open in turn and 12F operates to condition '1.' Gate 1G19 is now opened since 11F and 12F are both in position '1,' follower by 1G22 and 14F operates to condition '1.'

In time t2, 14f1 operates, via a gate 21G1, a stepping device 2C from its rest position R to stage '1' to record that the circuit loop has been closed for one complete cycle of association between the control circuit and all the registers.

As before in t4, the closed condition of the calling loop is recorded and with 2C at '1,' and 14F at '1,' gate 2G1 opens in t4 to write the condition of 2C in a register core via the line L27. This register core is also threaded by both row wires. At the end of t4 the stepping device 2C is triggered to its rest condition. In t5 gate 2G11 opens and 2C is set to stage '1' again. In t8 gate 2G1 opens and the core again stores '1.' In t8 device 2C is again returned to R.

Third association

In each further association until dialling begins 12F and 14F operate (as before) to condition '1' in t1. In t1 gate 2G11 opens to set 2C to stage '1' so that when gate 21G1 opens in t2, device 2C is stepped to stage 2. In t4 the stage of 2C is recorded in a second cell via line L22. In t5 the cell of L22 is read out and recorded in 2C and in t8 the condition of 2C is rerecorded. In this manner the number of associations of the register with the trunk is recorded in the register whilst the register is disassociated from the common equipment.

If the reception of digits is delayed until the loop has been closed for a particular number of cycles of association an alarm circuit can be actuated by 2C if desired.

Xth association (dialling having commenced since the last association)

When the register is first associated with the trunk during the first impulse of the first dialled digit, the open loop will result in removal of potential from 11X, gate 1G9 will not open in t1 and 11F remains in condition '0.' At the same time 12F is operated to its '1' condition from the loop condition register core via L12. In consequence 14F remains in condition '0' and no potential is applied to the stepping device 2C in t2.

(x+1) association

Once again, 11F remains in condition '0' and as 12F is not changed over to the '1' condition, since the loop condition register core was read out in the previous association, 14F operates via 1G18 in t1, and in t2 the device 2C is stepped to stage '1.' In time t4, potential via 2G1 records the '1' condition in the register core associated with stage '1' of 2C after which 2C is returned to the rest condition.

(x+2,3,4) association

The length of a dial break is 66.6 milliseconds, which is four of the cycles of association. During the x+2 association, 2C steps to stage 2 during t2. During the (x+3) association 2C steps to stage 3, and during the (x+4) association, 2C steps to stage 4. The output 2c4 from 2C can pass via a gate 2G13, 2G14 to a bi-stable device 25F when inputs 11f1 and 14f0 are applied to the gate 2G13. Each operation of 25F to the '1' condition results in the application of a pulse, via a gate 4G21 in t2 to a stepping device 4C (FIG. 4) which will step once for each such operation and therefore once for each impulse of a digit.

(x+5,6,7) association

During (x+5) and (x+6) associations, occurring during a period of 33 milliseconds, counter 2C will be stepped two stages as before but on the (x+7) association the loop will again be found open for the second impulse and the stepping device 2C will again be returned to the rest position.

A set of associations during which the remainder of the first digit is received The device 4C will be stepped once for each impulse and at the end of the digit the device will indicate its value.

Seven associations after digit ends

As before while the loop remains closed the number of associations is counted by 2C and as the inter-digital pause is longer than the impulse breaks or makes, the stepping device will step until the seventh stage is reached, i.e. until 2C gives an output 2c7. When the seventh stage is reached by 12C gates 2G16 and 2G18 are opened 11f1 being operated, and a bi-stable device 26F is operated to condition '1,' so that a pulse is applied to a stepping device 3C in FIG. 3. The digit recorded in 4C must be transferred to allow the next digit to be counted. Four digit horizontal transfer equipments and vertical transfer means are shown in FIG. 5 and these are both used for storing digits during reception and during extraction. This is possible because these two main functions are controlled in first and second halves t1 to t4 and t5 to t8 of each sub-cycle respectively. It does mean, however, that each digit transfer equipment must have associated with it two rows of storage cores so that when a transfer equipment is handling two digits in the same cycle, one incoming and one outgoing, the two digits can be separately stored in the corresponding cores of the two rows. Thus a transfer equipment in the control circuit can receive the record of an incoming digit from one row in t1, process the record in position t2, return it to the stores in t4, receive the outgoing digit in t5 from the other row, process the outgoing digit in t6 and return it to said other row in t8. Each digit traverses the transfer equipments first from left to right and then is transferred by the vertical transfer means to the other row and hence comes under control of the second sub-cycle.

It will be appreciated that when a first digit has been transferred from the equipment shown in FIG. 4 to that shown in FIG. 5, further digits can be received under control of the control equipment in FIGS. 1–3 as already described, each in turn being transferred to the equipment of FIG. 5.

The operation in FIG. 5 will now be described.

It will be recalled that after each digit has been received the bi-stable device 26F goes to condition '1' which indicates that the record of the pulses, i.e. the digit, held in 4C should now be transferred. One of the gates 561 to 560G of a set of storage cells 51C is opened in t2 by an input 26f1 and one of the inputs 4C1 to 4C0 from the stepping device 4C. That is, the common set of storage cells 51C is set to hold the digit held in 4C. For simplicity it will be assumed that the digit 2 is the one being processed. Any other digit would be processed in the same way.

Gate 562G is opened in t2 by 26f1 and 4c2 and the digit 2 is stored in storage cells 51C. In t3 of the same cycle gate G512 is opened if an input 52cr is applied thereto from a next set of common storage cells 52C which gives the output 52ce when in an empty state E. The set should normally be in the empty state when about to receive the digit from 51C. However, if 52C is not empty the digit will be written, by means of a half write pulse, into the cell of the t1 to t4 row in t4 via 512L, and will be re-entered into 51C in t1 of the next association. This is necessary since the set 51C is returned to the E state in t4 as well as in t8. As the digit is entered into 52C, a bi-stable device 512F is set to '1' to give an inhibiting output to gate 52G7 to prevent the digit from being re-entered into 51C on the next association.

The digit 2 is held in 52C in t3 and written into a cell of the t1 to t4 row by a half write pulse via the line 522L in t4 where it remains during the rest of the association period t5 to t8. In t1 of the next association the digit is read out and put into the set of common storage cells 52C once more. In t2 the gate 522G opens and the digit is fed in to the set 53C provided the latter is empty. In t3 the gate 532G opens and the digit is transferred to the set 54C, and in t4 the digit is stored in the cell of the t1 to t4 row via the line 542L for the rest of the cycle. In t1 of the next association the digit will be read out and be entered once more into 54C. In t2 the digit will be entered into the set 55C. In t4 the digit will be stored in a cell threaded by the line 552L this cell (as well as the other cells threaded respectively by 551L to 550L) is threaded by both row lines so that it is subjected to all the t1, t4, t5, t8 pulses. Thus in t5 of the same association the digit will be re-entered into 55C, and in t6 the gate 552G will open to allow the transfer of the digit to 54C. It will be appreciated that the digits are now being processed during the t5 to t8 periods. In t7 the gate 5412G opens and the digit is entered into 53C. In t8 the digit is stored in the cell of the t5 to t8 row threaded by 532L line. In t5 the digit is transferred to 53C once more and in t6 the digit is entered into common set of storage cells 52C. In t7 the gate 5212 opens and the digit is entered into the set 51C. In t8 the digit is stored in the t5 to t8 row threaded by the line 512L. In t5 of the next association the digit will be read out and entered into 51C, but in t8 it will be re-stored. The next digit, for example '0,' will follow the same route as the first digit, but on reaching the set 52C the gate 5210G will not open as the set 51C holds the first digit, in this example digit 2, in t5 to t8. In t8 the '0' digit is stored in the cell of row t5 to t8 via the line 520L. In the next association in t5 the '0' digit stored in the t5 to t8 row is entered into the set 52C once more. The third digit follows the same route as the preceding digits but is stored in one of the cells of the t5 to t8 row associated with the set 53C and is held in the sub-register during t5 to t8.

In the same way the first four digits are held simultaneously in the sub-registers 51C to 54C during t5 to t8.

The digits can be extracted from the register either one by one, or a number can be extracted simultaneously. In the first case the successive out-puts from the sub-register 51C during t5 to t8 will be the digits stored in the register, and they will appear in the order that they were entered into the register. In the case where the first three digits are required, simultaneously, for example for translation, the outputs from the sub-registers 51 to 53C during t5 to t8 are the three digits first entered, and these will appear simultaneously.

The common sets of storage cells 51C to 55C and the devices 11C, 2C, 3C and 4C have been shown as decimal devices but combinations of binary devices, such as flip-flops could equally well be used.

While the principles of the invention have been described above in connection with specific embodiments, and particular modifications thereof, it is to be clearly understood that this description is made only by way of example and not as a limitation on the scope of the invention.

What I claim is:

1. Equipment for concurrently processing a number of information items on a multiplex basis, comprising user circuits from each of which a respective information item can be available, a data processing circuit common to said user circuits and having sets of storage cells for handling a sequence of data processing operations, a matrix of storage cells arranged in rows and columns which has a respective pair of rows individual to each of said user circuits and which is divided up into sets of columns each allocated to a particular operation in said sequence of data processing operations and each connected with a respective common set of storage cells in said common data processing circuit, means for applying half-write pulses to all the column circuits of said matrix under control of said common sets of storage cells in synchronism with half-write pulses on said rows, access equipment for giving access in a first repetition time cycle to the rows of cells in said matrix and for applying read and half-write pulses in turn to each row of cells during each association therewith, scanning equipment between said common data processing circuit and said user circuits for connecting said user circuits in a second repetitive time cycle having half the speed of the first cycle and for permitting, in seriatim, the entry of data into said common data processing circuit from said user circuits, first transfer means in said common data processing equipment for transferring data between different common sets of storage cells in said common data processing circuit so that such data can travel in both directions in turn along the common equipment and therefore along said matrix, means for producing an electrical pulse sub-cycle covering two time positions of said first repetitive time cycle and having 2x pulses per cycle (so that x pulses of said cycle occur in each time position of said first cycle), second transfer means at one end of said common data processing equipment for transferring data from one row to another in said matrix, whereby data in each pair of rows is entered in the common set of storage cells whilst the respective user circuit is associated with said common data processing circuit, a sequence of data processing operations take place in turn in successive positions in said common circuit in both directions in turn, the operations included in the "East-West" travel of data all take place in the first x pulses of each sub-cycle and the operations included in the "West-East" travel of data all take place in the second x pulses of each sub-cycle, the contents of the common sets of storage cells are stored in one row of matrix cells of a pair of rows individual to a user circuit by means of said half-write pulses on the one row and on all columns after an "East-West" operation has been handled and are stored in the other row of matrix cells individual to the user circuit after a "West-East" operation has been handled, and transfer of data from one matrix row of a pair of rows to the other takes place by said vertical transfer means at the "West" end of said common data processing circuit.

2. Equipment as claimed in claim 1 in which said second transfer means comprises a plurality of columns of said matrix having half the number of rows of cells per column than those of the normal columns, the row wires of each pair of rows both being associated with the corresponding sigle cells in said plurality of columns, and a common set of storage cells associated with said plurality of columns and arranged to receive data from another common set of storage cells, to enter such data into said plurality of columns during one half of a sub-cycle and to receive the data from said plurality of columns in the other half of the, or a later, sub-cycle.

3. Equipment as claimed in claim 1 in which said first transfer means is arranged to make a plurality of successive transfers of data between successive common sets of storage cells during one sub-cycle.

4. A register-controller for use in a telecommunication system including equipment as claimed in claim 1, in which said user circuits are constituted by trunks, in which one of said sets of columns is allocated to receive data concerning the circuit states of the trunks, a second set is allocated to receive data concerning the number of consecutive times that each trunk has been in the same state, a third set is allocated to receive data concerning the number of dialled pulses, and a fourth set is allocated to receive, in the dialled order, data concerning the dialled digits, and in which a number of other sets of columns is allocated to receive the digit data obtained from said fourth set and to hold such data in all rows so that data concerning one or more of the digits first dialled become(s) available in one half of a sub-cycle and one or more of the digits dialled later become(s) available in the other half of a sub-cycle.

5. Equipment for concurrently processing a number of information items on a multiplex basis, comprising incoming user circuits from each of which a respective information item can be available, outgoing user circuits to which processed information items are eventually retransmitted, a data processing circuit common to said user circuits for handling a sequence of data processing operations, a matrix of storage cells arranged in rows and columns which has rows each individual to one of said incoming and outgoing user circuits and which is divided up into sets of columns each allocated to a particular operation in said sequence of data processing operations and each associated with a respective common set of storage cells in said common data processing circuit, means for applying half-write pulses to all the column circuits of said matrix under control of said common sets of storage cells in synchronism with half-write pulses on said rows, access equipment for giving access in a first repetition time cycle to the rows of cells in said matrix and for applying read and half-write pulses in turn to each row of cells during each association therewith, incoming scanning equipment between said common data processing circuit and said incoming user circuits for scanning said incoming user circuits in a second repetitive time cycle having a specific relation to the first cycle and for permitting, seriatim, the entry of data into said common data processing circuit from said incoming user circuits, first transfer equipment in said common data processing equipment for transferring data between different common sets of storage cells in said common data processing circuit so that such data can be handled successively in different ways forming a related sequence of operations, and outgoing scanning equipment between said common data processing circuit and said outgoing user circuits for scanning said outgoing user circuits in a third repetitive time cycle having a specific relation to said first and second time cycles and for permitting, seriatim, the flow of data from said common data processing circuit to said outgoing user circuits.

References Cited in the file of this patent

UNITED STATES PATENTS

| | | |
|---|---|---|
| 2,623,948 | Hansen | Dec. 30, 1952 |
| 2,716,158 | Shenk et al. | Aug. 23, 1955 |